J. M. BARR.
BEARING.
APPLICATION FILED JUNE 3, 1920.
1,368,998.
Patented Feb. 22, 1921.
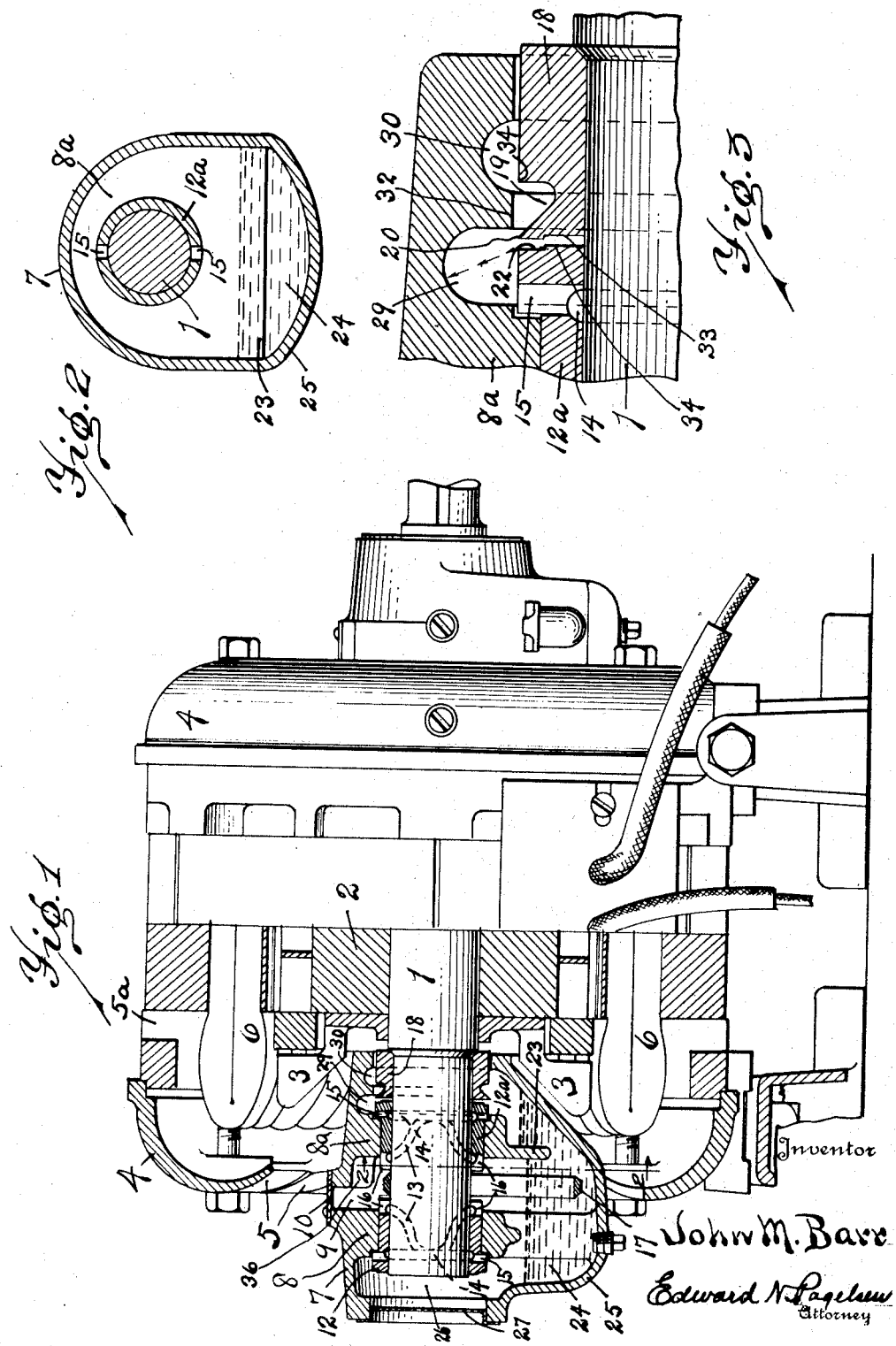

UNITED STATES PATENT OFFICE.

JOHN M. BARR, OF HOWELL, MICHIGAN, ASSIGNOR TO HOWELL ELECTRIC MOTORS COMPANY, OF HOWELL, MICHIGAN, A CORPORATION OF MICHIGAN.

BEARING.

1,368,998.     Specification of Letters Patent.     Patented Feb. 22, 1921.

Application filed June 3, 1920. Serial No. 386,239.

*To all whom it may concern:*

Be it known that I, JOHN M. BARR, a citizen of the United States, and residing at Howell, in the county of Livingston and State of Michigan, have invented new and Improved Bearings, of which the following is a specification.

This invention relates to the construction of bearings, especially those designed for the shafts of high speed machinery such as centrifugal fans and the armature shafts of electric motors and generators, and its object is to prevent as far as possible any passage of lubricant from the bearing to the armature or other rotating element.

This invention consists in means for dividing the lubricant reservoirs of the bearings of high speed shafts by means of a partition which extends down into the lubricant in such a manner as to constitute a trap or seal and to reduce the volume of the chamber from which air may be drawn, to a minimum.

It also consists in means for interrupting the oil carried along the bearing by air currents and in a conduit for returning the oil to the main reservoir.

It further consists in the details of construction illustrated in the accompanying drawing and particularly pointed out in the claims.

In the drawing, Figure 1 is a view, half in side elevation and half in longitudinal vertical section, of an electric machine provided with my improved bearings. Fig. 2 is a section on the line 2—2 of Fig. 1. Fig. 3 shows an oil interrupter on a larger scale.

Similar reference characters refer to like parts throughout the several views.

The electric machine in Fig. 1 is shown conventionally with an armature shaft 1, armature 2 with radiating fan blades 3, a housing 4 provided with the usual air passages 5 and $5^a$ and field windings 6. The housing supports the bearing casing 7 provided with the supporting rings 8 and $8^a$ for the bearing between which is a filler opening 9 normally closed by the cap 10.

Bearing sleeves or bushings 12 and $12^a$ are mounted in the rings 8 and $8^a$ and each has a circumferential internal groove 14 and a zig-zag groove 13. Radial holes 15 and notches 16 permit lubricating oils to drain from these grooves. A ring 17 on the shaft 1 carries oil 24 up from the reservoir 25 onto the shaft from which it flows longitudinally to the notches 16 and the grooves, this action being assisted by the downwardly extending barrier 36.

Secured to the shaft is a collar 18 which is generally cylindrical but is formed with a groove 19 near its outer end (Fig. 3) which results in a sharp edge 20. The inner adjacent end of the bushing $12^a$ is cut away at 22. Depending from the ring $8^a$ is a partition 23 which extends down below the surface of the lubricant in the reservoir 25.

When the fan blades 3 are revolving at high speed, air is thrown out through the openings 5 and $5^a$, resulting in a reduction of pressure about the shaft 1. Air will flow from the passage 9 and the central opening 26, notwithstanding the cap 10 and the plug 27. This flow of air will draw the lubricant along every wetted surface until some of it escapes entirely from the bearing housing and is thrown out by centrifugal force, and the action of the blades 3, against the armature and pole windings, which is most objectionable.

To reduce the flow of air to a minimum, I have extended down the partition 23, which not only constitutes a support for the ring $8^a$ and bushing $12^a$, but which extends below the normal level of the lubricant and divides the reservoir 25 in two parts, of which the inner part has no outside opening except around the shaft 1. This has very materially reduced the escape of lubricant.

I have formed the inner portion of the bearing support with two semi-circular grooves 29 and 30, separated by a rib 32. When lubricant moves along the bearing $12^a$ and crosses the groove 15, some of it may reach the outer face 33 of the collar 18. The lubricant will be thrown outward by centrifugal force along this face 33 until it reaches the edge 20 and most of it will be thrown from this sharp edge into the groove 29 and against the wall thereof, and run down into the main reservoir 25.

The shaft 1 in practice moves longitudinally short distances, but sufficiently to bring the end 33 forcibly against the inner end 34 of the bearing sleeve $12^a$. This contact is sufficient to atomize some of the lubricant on this end 33 and to throw it outward radially of the shaft 1. By reducing this end of the sleeve $12^a$ to form a circular shoulder 22, the direction of the atomized lubricant is caused to be that of the arrows in Fig. 3 and the lubricant strikes the curved wall near its deepest part, thus avoiding exposure of the lubricant to the slight air current produced by the pumping action of the collar 18 in the housing. Part of it never gets by the surface 22. In time, the end 33 of the collar becomes worn, as shown in Fig. 3, which causes a greater inclination to the path of the atomized lubricant.

The collar 18 is also formed with a second corner 34 just within the groove 19, and substantially all the lubricant which passes the sharp edge 20 is thrown out at this plane against the outer part of the semi-cylindrical groove 30. The amount of lubricant which passes the edge 34 is negligible.

The details and proportions of the several parts of this bearing may all be changed without departing from the spirit of my invention as set forth in the following claims.

I claim:—

1. In combination, a bearing casing comprising a pair of bearing-supporting rings and a lubricant reservoir, bearing sleeves within the rings and a shaft mounted in the sleeves, a ring oiler between the sleeves, and a collar on the shaft extending into the inner end of the casing, the outer end of the casing being closed, the inner end of the collar being formed with a sharp edge and the casing being formed with a groove extending circumferentially half way around the collar at its inner end, the end of the bearing sleeve adjacent the collar being of less diameter than the inner end of the collar.

2. In combination, a bearing casing and a pair of bearings therein, a shaft mounted in said bearings, said casing also comprising a reservoir for the lubricant and a partition extending down from the inner bearing into the lubricant to divide the air space in the casing into two parts and to seal against the passage of air into or out of the inner chamber by the lubricant itself, and an oiler ring on the shaft between the bearings.

3. In combination, a bearing and a casing therefor embodying an oil receptacle below the bearing, and a collar secured on the shaft adjacent said bearing and provided with a circumferential groove near the bearing which produces two sharp edges, said casing being formed with grooves extending half way around the collar to receive the lubricant thrown off at the sharp edges of the collar and permit it to run down to the reservoir, the inner of said grooves extending around the inner end of the collar and the outer end of the adjacent bearing and the outer of said grooves extending around the outer wall of the groove in the collar.

4. In combination, a bearing and a casing therefor embodying an oil receptacle, the end of the bearing being formed with a circular shoulder, and a collar secured on the shaft and having a radial face extending beyond the shoulder, said casing being formed with a groove extending half way around the end of the bearing and the adjacent end of the collar and adapted to receive the atomized lubricant thrown out when the oiler contacts with the bearing.

5. In combination, a bearing casing having one end closed, a bearing in the casing, a shaft extending into the casing and mounted in the bearing, said casing also comprising a reservoir for the lubricant, a collar on the shaft extending into the casing, a partition within the casing extending down into the lubricant and dividing the casing into two unequal parts, the smaller being at the open end, the larger part being provided with a filler opening.

6. In combination, a bearing casing and a pair of bearings therein, a shaft mounted in said bearings, said casing also comprising a reservoir for the lubricant and a partition extending down from the inner bearing into the lubricant to divide the air space in the casing into two parts, and an oiler ring on the shaft between the bearings, said bearings being provided with circumferential oil grooves at one end and with zig-zag grooves connecting thereto.

JOHN M. BARR.